Apr. 24, 1923.
E. B. THORNHILL
1,452,627
PROCESS FOR THE PRODUCTION OF SPONGE IRON AND OTHER METALLIC PRODUCTS
Filed Jan. 21, 1921  2 Sheets-Sheet 1
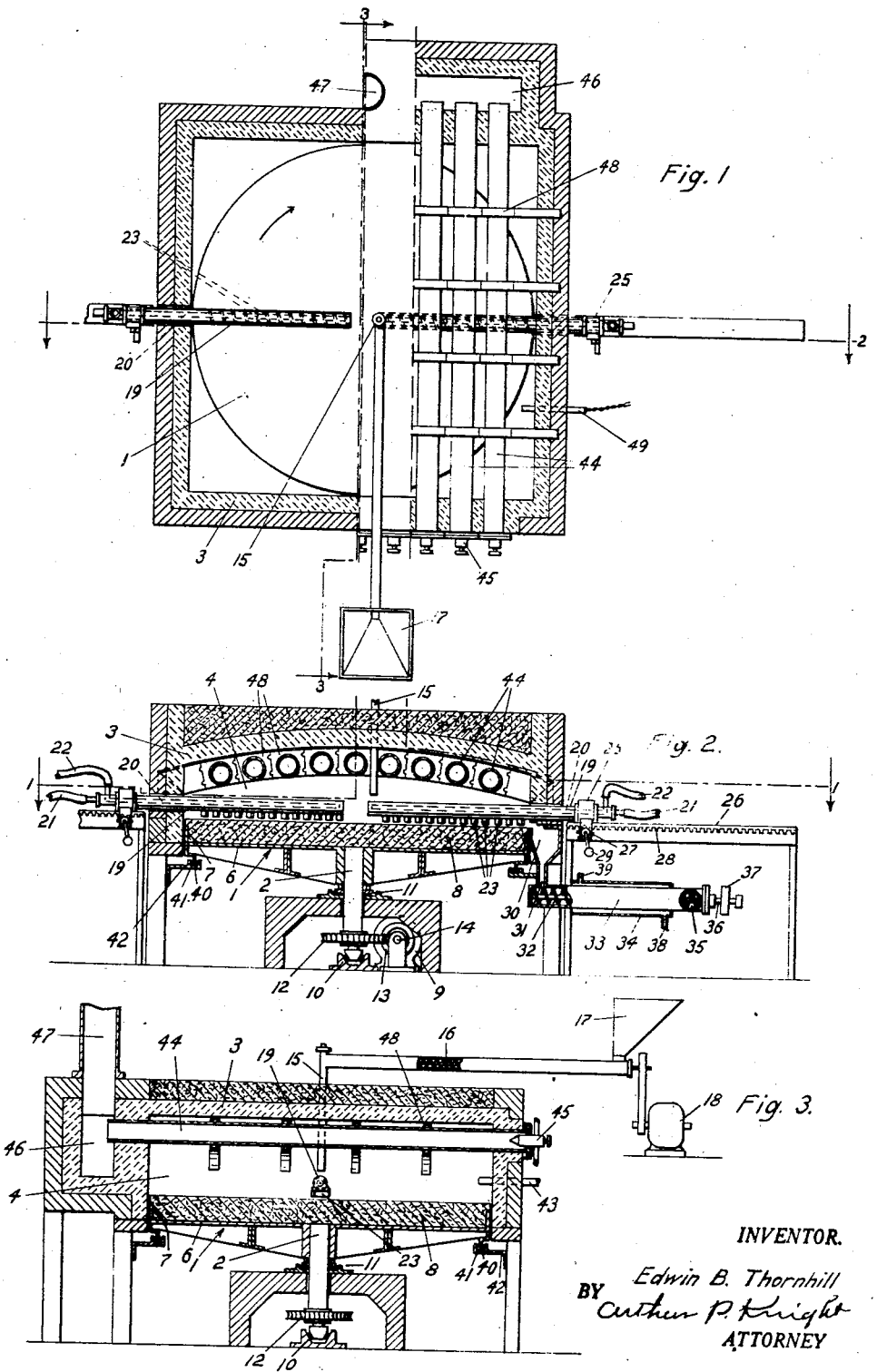
INVENTOR.
Edwin B. Thornhill
BY
ATTORNEY

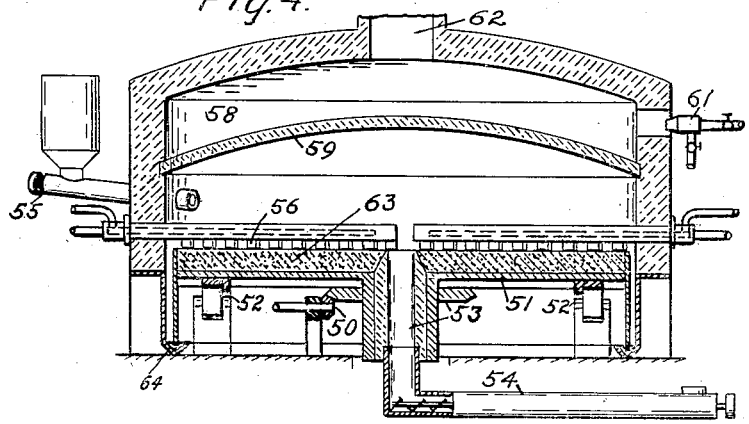
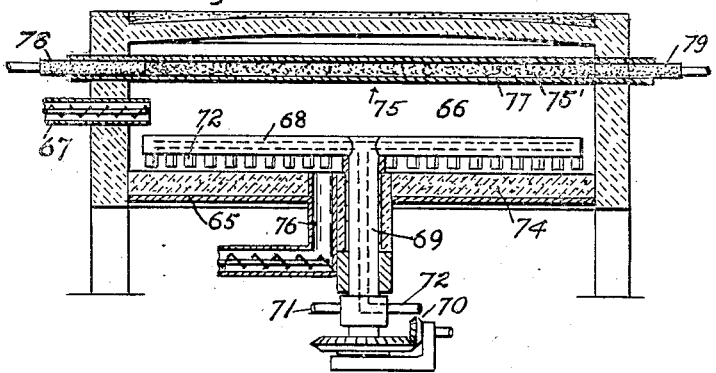
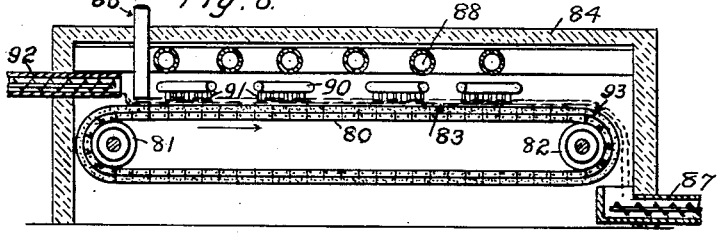

Patented Apr. 24, 1923.

1,452,627

UNITED STATES PATENT OFFICE.

EDWIN B. THORNHILL, OF HURLEY, NEW MEXICO.

PROCESS FOR THE PRODUCTION OF SPONGE IRON AND OTHER METALLIC PRODUCTS.

Application filed January 21, 1921. Serial No. 438,957.

*To all whom it may concern:*

Be it known that I, EDWIN B. THORNHILL, a citizen of the United States, residing at Hurley, in the county of Grant, State of New Mexico, have invented a new and useful Process for the Production of Sponge Iron and Other Metallic Products, of which the following is a specification.

This invention relates to the recovery of metals from ores or calcines, and particularly to the production of sponge iron, which is metallic iron reduced from iron ore without fusion, the resulting product having the properties of friability and porosity resulting from its manner of production and being especially adapted for use in certain processes by reason of this physical structure, for example, as a precipitating agent in the hydrometallurgy of copper and other metals. The sponge iron produced by my process may be used, however, in the manufacture of iron and steel, as well as for other purposes.

The main object of the present invention is to provide for the production of sponge iron in an effective and economical manner and to overcome certain difficulties which have heretofore prevented such production on a commercial scale.

A further object of the invention is to heat the ore without the use of heating blast directed in contact with the ore or into the ore reducing chamber, thereby ensuring reduction of the iron ore in a relatively quiescent reducing atmosphere and avoiding the liability either of the finely divided ore being carried off by the heating blast, or of re-oxidation of the reduced iron by production of an oxidizing atmosphere in contact with the reduced iron.

Another object of the invention is to carry on the reduction of iron ore to sponge iron in a continuous process and to prevent interruption of the reducing operation in such a continuous process by reason of the ore or of the reduced iron agglomerating into masses or adhering to surfaces in contact therewith.

One of the serious difficulties which has been encountered in the production of sponge iron has been the tendency of the reduced iron to cohere by incipient fusion or sintering action, due to the fact that the temperature required for adequately rapid reduction is sufficiently high to cause a tendency to softening of the reduced metal, with a resulting tendency of the particles to cohere and also to slag with the silicious impurities present in all iron ores, and to form an agglomerating mass, which has to be subsequently broken up and which is liable to clog the furnace chamber and interfere with the operation of the withdrawal of the material from the furnace. Another difficulty which has seriously interfered with the commercial production of sponge iron is the tendency of the reduced metal and slags formed as stated to adhere to the supporting walls or surfaces in such manner as to arrest the operation of the furnace after a comparatively limited time. Another difficulty in sponge iron production in furnaces in which the heat is applied to the materal by conduction is that the said material, a mixture of finely divided iron ore and carbonaceous material, offers extreme resistance to conduction of heat therethrough. Another difficulty that has arisen in sponge iron production when the reducing chamber has been heated by a blast of flame introduced directly thereinto, is the prevention of reduction or the reoxidation of iron already reduced by introduction of excess of air into the reducing chamber in the operation of such blast. A further difficulty in the operation of a sponge iron producing process has been to maintain effective contact of the reducing agent with the ore, it being understood that the reducing agent generally consists of a gas, which is applied to the furnace in the form of an externally produced gas or is produced in the furnace itself, for example, as carbon monoxide derived from carbonaceous reducing agent mixed with the ore, but that in order to maintain the reducing action it is necessary to provide for access of this gas to all parts of the ore and therefore to maintain the ore in open condition and prevent compacting of the ore. These difficulties are overcome, according to my invention, by carrying out the reducing operation in the manner hereinafter set forth. The essential features of the invention being:

First: The ore, mixed with a solid reducing agent such as carbonaceous material, is caused to travel in a layer on a supporting bed and is continually stirred or turned over while so travelling.

Second: Heat is applied to the layer of ore by radiation from above to maintain the heat necessary for the reducing operation without the necessity of any heating blast being directed in contact with the ore and without the transmission of heat to the body of the ore through an external wall or supporting bed, or through the material being treated. An important feature of this operation is that the heat is applied to the body of the ore by radiation from a surface which is not in contact with the ore, so that there is no possibility of the ore adhering to such surface.

Third: The ore is supported, during the reducing operation, on a surface which is non-adherent to the reduced iron and which is not used for conducting heat to the ore and which is at a temperature below that of the body of the material being operated.

Fourth: The operation is carried on in such a manner that a reducing atmosphere is maintained in contact with the ore and at a pressure in excess of atmospheric pressure, so as to prevent access of outside air and insure the maintenance of a reducing atmosphere.

The process may be carried out in various forms of apparatus, several forms of such apparatus being illustrated in the accompanying drawings, wherein—

Fig. 1 is a horizontal section on line 1—1 in Fig. 2 of a rotary hearth furnace adapted for carrying out the invention;

Fig. 2 is a vertical section thereof on line 2—2 in Fig. 1;

Fig. 3 is a vertical section on line 3—3 in Fig. 1;

Figs. 4 to 6 are vertical sections of modified forms of such apparatus.

Referring to Figs. 1 to 3, the furnace therein shown comprises a rotary hearth 1 mounted to rotate on a vertical shaft 2 and a furnace casing or inclosure 3, which extends over and around said hearth to form a reducing chamber 4 above the hearth. Said furnace casing is here shown as having an arch shaped roof but it may be of any suitable form and may be constructed of any suitable material, for example, ordinary brick lined with firebrick.

The rotary hearth 1 may comprise a metallic floor member 6, circular in form, having peripheral flange 7, forming a pan in which is supported a bed 8 of suitable material, which is non-adhering to the reduced metallic iron at the temperature of operation of the furnace. The material I prefer to use for this purpose is carbon in the form of crushed coke spread on the supporting member 6, the lower portion of this bed being, preferably, of relatively coarse coke, or similar material, and the top portion or surface layer thereof being of relatively finely divided coke, or similar material. The shaft 2 for the rotary hearth is journaled in a step bearing 10 at its lower end and is provided with an upper bearing 11 and is operated by any suitable means to effect a slow rotation of the hearth. For this purpose said shaft may carry a worm gear 12 operated by worm 13 on a shaft 14 driven by any suitable means, preferably a variable speed motor 9 to permit of control of the speed of rotation of the hearth.

A feed chute 15 extends downwardly through the roof of the furnace casing so as to discharge the ore, together with the reducing agent, onto the rotary hearth, preferably near the center thereof, the ore and reducing agent being fed to this chute by any suitable means, for example, by a screw feed device 16, feeding the material from a hopper or bin 17, and operated by a variable speed driving means 18.

Stationary rabbling devices are provided for moving, agitating and turning over the material on the rotary hearth. Two rabbling devices are shown herein, it being understood that any desired number may be used. Each of said rabbling devices comprises a tube or hollow arm 19 extending through the side wall of the furnace casing and having a pipe 20 extending longitudinally therein to form two passages communicating together at their inner ends and communicating, respectively, at their outer ends with inlet and outlet connections 21 and 22 for water, or other cooling fluid. These tubes or arms 19 support the rabble blades 23, which consist of plates of suitable resistant material, preferably graphite, and are mounted on the supporting members 19 so as to extend obliquely to the direction of movement of the material on the adjacent portion of the rotary hearth; it being understood that these rabble blades extend from the supporting members 19 down to the top of the material supporting bed 8 so as to penetrate or extend into and through the body of the ore and reducing agent supported on said bed and to continually stir the same as such body is carried around by the motion of the rotary hearth; the obliquity of these rabble blades also enabling them to act as pushers for forcing the material being treated radially outward on the rotary hearth and eventually discharging it from the outer edge of the hearth. The two rabbling devices described are shown as diametrically opposite and the rabbling plates thereon as arranged at intermediate radial distances in the case of the opposite device, so that the action of each rabble blade on one arm pushes the material outward in position for operation thereon by the corresponding rabble blade of the opposite arm, and the rabbling device being fixed, the material is finally pushed off of the hearth at a definite position adjacent to the rabbling device having the outermost rabbling blade and at this point of discharge a collecting hopper 30 is provided to receive the material so discharged and conduct it through a chute 31 to an outlet conveyor 32. Said outlet conveyor is shown as a screw conveyor mounted in a horizontal tube 33, which is provided with a water jacket 34, having inlet and outlet connections 38 and 39 for cooling the conveyor tube, so as to reduce the temperature of the sponge sufficiently to prevent re-oxidation when it is finally discharged through outlet 35, near the outer end of tube 33. Conveyor 32 is carried by a horizontal shaft 36 operated by driving means 37 in any suitable manner. Rabble arms 19 are preferably mounted to slide through openings in the wall of the furnace to enable repair or removal thereof, each arm 19 being, for example, mounted on a carrier 25 sliding on a horizontal track 26 and operated inwardly or outwardly by a gear 27 on the carrier engaging with a rack 28 on said track, said gear 27 being manually operated by a crank 29.

To prevent access of external air through the joint between rotary hearth and the furnace casing, said hearth is preferably provided with a depending annular flange 40 running in an annular trough 41 on a floor member 42 extending from the side wall of the furnace casing, said trough being packed with finely divided solid heat resistant material, such as powered coke, to form a seal for the joint. The rotary hearth is exposed to the outer air at its lower surface, so that such hearth will always be at lower temperature than the reducing chamber. An inspection opening 43 may be provided in the side wall of the furnace casing, said opening also operating as a vent for escape of excess gas, but being sufficiently small to restrict the outflow of gas therethrough, so as to insure maintenance of a condition of pressure within the reducing chamber, in excess of atmospheric pressure.

Heating means 44 extend in reducing chamber 4 and above rotary hearth 1 so as to heat the material on the hearth by radiation, said heating means being out of contact with the material being treated. Said heating means preferably consists of horizontal tubes of suitable resistant material extending through the side walls of the furnace, said tubes being open at one end for reception of burners 45 and opening at the other end into an outlet chamber 46 communicating with a stack 47. Said heating tubes 44 may consist of any suitable refractory material, preferably material of good thermal conductivity, for example, carborundum, or similar material, and are supported from the roof of the furnace casing in any suitable manner, for example, by passing through openings in blocks 48 which interlock with one another and extend across the furnace chamber in the form of an arch.

My process may be carried out in the above described apparatus as follows:

Iron ore, which may consist of magnetite, or other oxidized ores of iron, or calcines produced by roasting sulfide ores of iron, is mixed with finely divided carbonaceous material, for example, crushed or powdered coal. It is desirable that the iron ore or calcine shall be in finely divided condition, say 30 mesh or finer, and the carbonaceous material should also be finely divided. It is also desirable that where coal is used as a carbonaceous reducing agent it should be free of moisture and contain not more than a certain amount of volatile matter. If the coal contains more than such amount, say 20% of volatile matter, it is preferably subjected to a retorting operation to drive off the hydrocarbons, distilling at low temperature, as well as any moisture present. The object of eliminating moisture and reducing the volatile hydrocarbon content of the carbonaceous material in this manner is to insure the maintenance of an atmosphere in the furnace which will not interfere unduly with radiation, it having been found that when the carbonaceous material used contains more than the stated amount of volatile matter, it produces cloudiness in the furnace chamber which interferes seriously with radiation from the heating tubes to the bed of ore.

Where the expression iron ore is hereinafter used, it will be understood to cover iron-bearing calcines, or other artificial oxides produced from iron ores.

The iron ore, mixed with the carbonaceous reducing agent, is supplied from the hopper 17 by the feeding means 16 and 15 to the reducing chamber 4, being deposited on the rotary hearth near the center thereof in position to receive the action of the rabbling devices as the material is carried around by the motion of the rotary hearth 8. The rotary hearth being caused to revolve slowly by its driving mechanism, the mixture of iron ore and carbonaceous material carried by the hearth is moved around with the hearth against the rabbling blades 23, which, by reason of their obliquity or inclination, push or sweep the material toward the periphery of the hearth, at the same time stirring and turning over the material so as to prevent or break up any cohering action that may take place and to continually expose fresh surfaces to the heating action.

During this operation, the heating devices 44 are brought to a high temperature by operation of the burners 45, the flames from which pass within and through the heating tubes 44 and heat the walls of such tubes so that they become incandescent; the heat being conducted through the walls and radiated from the outer surface thereof, part of the heat so radiated passing directly to the material distributed on the rotary hearth and part of such heat being radiated to the top and sides of the reducing chamber 4 and being radiated therefrom to the material on the hearth. By this means, the temperature of the reducing chamber is maintained at the point required for effective and economical reduction of the ore, for example, from 950° to 1000° C. It is essential that the temperature be controlled properly to ensure rapid reduction without fusion of the material, and for this purpose the speed of the hearth, the rate of feed, and the fuel supply to the burners are all regulated so as to maintain the requisite temperature, the temperature being observed by pyrometer means, indicated at 49. During the above described operation the reduction of the iron ore takes place and at the same time gases are produced maintaining the reducing atmosphere within the reducing chamber. Such reducing gases result partly from distillation of hydrocarbons from the coal or carbonaceous material, but an important element of the reducing gases is the carbon monoxide produced from reaction of the carbonaceous material with the iron oxide or with carbon dioxide previously formed, the effect of the operation being to continually generate gases of a reducing nature, thereby maintaining a condition of pressure within the reducing chamber which effectively excludes leakage or admission of atmospheric air and products of combustion from the outside into the chamber. Any excess of reducing gas thus produced may pass off through the vent 43, being ignited, for example, at said vent, or such gases may be utilized, for example, by burning them in the combustion tubes 44. By the time the material reaches the discharge point at the periphery of the rotary hearth, it is substantially in reduced condition, the iron content thereof being in metallic condition, at least to the extent required in practice, and being in the form of a sponge and presenting an extreme degree of porosity and friability. The sponge thus produced, together with any excess of carbonaceous material discharged therewith, passes through the devices 30, 31 and 32 to the outlet 35, being cooled in transit so that when it is discharged it is sufficiently cool to prevent any re-oxidation of same. I have found that material so produced may be kept substantially free from oxidization for an indefinite period of time as long as it is maintained in substantially dry condition. The excess carbon present in the product discharged from the furnace may be removed from the sponge iron by any suitable separating means, for example, a magnetic separator, and this carbon may be returned to the furnace along with a fresh portion of the ore, any excessive ash may be removed from time to time by screening, or otherwise, to prevent accumulation.

An important feature of the above described operation is that the heat, including that required for the reducing reaction, which is strongly endothermic, is maintained by radiating the heat onto and into the body of the material from the source or heating means within the reducing chamber, but above and out of contact with the material being reduced. This has the advantage that there is no possibility of the material coming in contact with the heating means and adhering thereto by reason of the high temperature thereof. This enables material, such as carborundum, to be used for the walls of the heating means which would, at the temperature existing therein, tend to adhere to the ore or to the reduced iron under the conditions of operation of the furnace if brought in contact therewith. As almost all materials which have the requisite refractory properties for these heating elements are subject to this disability of tending to adhere to the material being treated when at the required temperature, the provision for maintaining the heating element out of contact with the material being treated contributes essentially to the continued operation of the furnace; moreover, the fact that the heating elements are out of contact with the material being treated relieves them from the wear or abrasion due to the motion of such material.

Another important feature of the above described operation is that the mixture of iron ore and carbonaceous material is supported during the entire operation on a bed of material which is non-adherent thereto, namely the bed 8 of carbon or divided coke, which has the property of permitting passage of the hot material, whether iron ore or reduced iron in contact therewith, without tending to adhere thereto to any considerable extent under the temperatures maintained at the zone of contact. In this connection, the fact that the carbon of the hearth is in divided condition and is supported on a hearth which is exposed on its under face to contact with the outer air, tends to prevent the temperature of such zone of contact from becoming unduly high and to maintain the temperature of the bed below the temperature in the reducing chamber and below the temperature of the mixture of iron ore and reducing agent. Furthermore, any particles of carbon that may be caught up from the bed by the advancing body of ore and reducing agent and carried along therewith, do not interfere with the operation of the machine or with the quality of the product, the amount of such carbon being negligible and provision being made, if necessary, for separation of excess of carbon from the resulting product.

As an illustration of another form of apparatus in which my invention may be carried out, reference may be made to Fig. 4, which illustrates, somewhat diagrammatically, a furnace of the rotary hearth type in which a single combustion chamber is provided as a source of heat for radiation to the material on the hearth. In this figure the rotary hearth, indicated at 51, is mounted to rotate in any suitable manner, for example, on roller bearings 52, and has driving means 50, and has a central discharge passage 53 leading to an outlet conveyor 54. A feeding device 55 is provided for feeding the mixture of iron ore and reducing agent onto this hearth and stationary rabbles 56 are provided for stirring such material on the hearth and forcing it toward the outlet passage 53. A combustion chamber 58 is provided in the upper part of the furnace, the floor 59 of said chamber extending over the rotary hearth so as to radiate thereto, and to the material thereon, the heat conducted through such floor from the combustion chamber and said combustion chamber is provided with a burner means 61 for heating the same and with an outlet stack 62 for products of combustion. The floor 59 of the combustion chamber, forming the top of the reducing chamber, is preferably of material, such as carborundum, of requisite resistance to heat and considerable conducting capacity. My process may be carried out in this form of furnace in substantially the same manner as above described, with the exception that material being treated is in this case fed at the peripheral portion of the rotary hearth and discharged at the central portion thereof. The rotary hearth is shown in this case as provided with a carbon bed 63, forming a non-adherent support for the ore. A water seal 64 is in this case provided for the joint between the rotary hearth 51 and the enclosing casing, said seal being sufficiently removed from the heated portion of the furnace to prevent undue evaporation.

My process is not limited to the use of a rotary hearth, for example, as illustrated in Fig. 5, a stationary hearth 65 may be provided, forming the bottom of a reducing chamber 66 which is provided with a means 67 for introducing the mixture of ore and reducing agent near the outer portion of such chamber and the rabbling means 68 in this case are shown as mounted to revolve on a vertical shaft 69 provided with driving means 70 and with means 71 and 72 for supplying a cooling liquid to the rabbling device. The stationary hearth 65 is preferably provided with a bed 74 of divided coke, substantially as above described and the rabbles 72 carried by the rabbling device 68 are preferably of material, such as graphite, which is resistant to the heat and non-adherent to the material being operated upon. The source of heat used in my process for radiating heat to the material being treated may be of any suitable character. Thus, in place of the heating elements above described, I may use electrical heating elements, such as indicated at 75, in Fig. 5, and comprising a conductor of considerable resistance connected in an electrical circuit. As an illustration this conductor is shown as consisting of fragments of coke, or other form of carbon, indicated at 75', contained within tubes 77 of refractory material, such as carborundum, electrodes 78 and 79 extending into opposite ends of the tubes 77 and making contact with the high resistance material 75' therein, such electrodes being connected to an electrical circuit for supply of current thereto. It will be understood that any number of the heating elements 75 may be provided and that same may extend over the hearth 65 so as to heat the entire area of the hearth or the material thereon to the proper temperature. In applying my process in connection with this form of apparatus, the operation proceeds as above described, except that the hearth remains stationary and the material is rabbled or raked thereover and is finally discharged at an outlet 76 in the condition of sponge iron mixed with more or less excess carbon and with the further difference that the heat in this case is provided by the current in the electrical heating elements 77 instead of by combustion of fuel in heating tubes.

The process can be carried on in a furnace providing for a straight movement of the material, for example, as shown in Fig. 6; the material may be supported on a travelling conveyor 80, for example, of the type of a Dwight-Lloyd sintering machine, mounted on supporting and operating means 81—82 to cause the conveyor bed 83 to move in a straight line, said conveyor being enclosed and covered by a casing or enclosure means 84 so as to maintain the material on the conveyor in a reducing atmosphere and prevent admission of outside air. Means 86 are provided for feeding a mixture of iron ore and carbonaceous material to said conveyor near one end thereof, and discharge means 87 are provided for removing from the furnace and cooling the reduced product. Heating elements 88 (which may be heated by hot products of combustion passing therethrough, or by electric current passing through resistance means, forming a part thereof) are provided in the reducing chamber, extending over the conveyor to cause heat to be radiated to the material on said conveyor. The bed 83 of the conveyor means may consist of a layer of divided carbon fed by means 92 onto an endless apron 93 of asbestos fabric, or other heat resisting flexible means, said carbon layer 83 underlying and supporting the ore material which is fed on to the top of same, and said layer protecting the conveyor from the heat and preventing adhesion. The carbon of this layer is discharged from the conveyor along with the residual product and may eventually be separated from such product by a magnetic separator, for example, and re-used in the operation.

Rabbling arms 90 extend over the conveyor and are provided with blades 91 of suitable non-adherent material, such as carbon, and are directed obliquely and reversely on alternate rabble arms to cause the material to be raked back and forth laterally with respect to the travel of the conveyor, and also, to be stirred and turned over to expose fresh surfaces to radiation from the heating means 88. In the operation of my process in this type of furnace the travel of the material is effected by the travel of the conveyor means. In other respects the mode of operation is as above described.

While the process above described is particularly adapted and intended for production of sponge iron it can also be used to advantage for production of other metals, for example, tin or zinc from ores thereof, suitable modifications being made in the apparatus used.

The apparatus herein shown is not claimed herein, as another application of even date herewith discloses and claims apparatus such as herein shown, together with other forms of apparatus suitable for carrying out this process.

What I claim is:

1. The process of producing sponge iron which consists in passing iron ore mixed with carbonaceous material over a non-heating supporting bed, in a reducing chamber and heating the mixture by heat radiated thereto from a source of heat out of contact with the mixture.

2. The process of producing sponge iron which consists in subjecting a mixture of iron and carbonaceous material to heat radiated thereto from a source out of contact therewith while such mixture is supported on a surface which is maintained at a lower temperature than the material resting thereon, and continuously and uniformly stirring and turning over the mixture while it is being so heated.

3. The process of producing sponge iron which consists in subjecting a mixture of iron ore and carbonaceous material to heat radiated to such mixture from a heating surface out of contact therewith, the mixture being supported, while so heated, by a supporting medium which is at lower temperature than said mixture.

4. The process of producing sponge iron which consists in causing the mixture of iron ore and carbonaceous material to travel over a bed of non-adherent material, and subjecting the mixture, while so travelling, to rabbling action and to heat radiated on to the material from above.

5. The process for producing sponge iron which consists in causing a mixture of iron ore and carbonaceous material to travel in a reducing chamber on a supporting bed of carbon, and subjecting such mixture to heat applied thereto from above.

6. A process, as set forth in claim 5, in which the supporting bed consists of carbon in divided condition.

7. A process for producing sponge iron which consists in rabbling a mixture of iron ore and carbonaceous material supported in a reducing chamber on a non-heating bed, to cause travel of such mixture over such bed, and turning over of such mixture, and radiating heat to such mixture from a source within said reducing chamber extending over said mixture but out of contact therewith.

8. A process, as set forth in claim 7, in which said non-heating bed is of material non-adherent to the heated material thereon, and said rabbling operation is performed by means having surfaces which are non-adherent to the said material.

9. A process, as set forth in claim 8, in which said supporting bed and said rabbling surfaces consist of carbon.

10. The process which consists in passing a mixture of iron ore and carbonaceous material onto a rotating hearth, rabbling said mixture on said hearth so as to stir the same and cause it to advance to a point of discharge and applying to the material, while it is in the hearth, heat radiated from a source of heat above the hearth.

11. The process which consists in subjecting a metal-bearing material to heat in a reducing atmosphere, the said heat being supplied to said material by radiation from a source out of contact therewith.

12. The process which consists in subjecting a metal-bearing material, while it is supported on a non-heating surface, and in a reducing atmosphere, to heat radiated thereto from a source out of contact therewith.

13. A process, as set forth in claim 12, in which the material is continually stirred and turned over during the heating operation to expose fresh surfaces to such radiation and to prevent agglomeration thereof.

14. The process which consists in moving a mixture of metal-bearing material and reducing agent on a non-adherent bed which is maintained at a lower temperature than said material, radiating heat to such material from a source out of contact therewith and extending over the same, and rabbling said material while it is being so heated.

15. A process which consists in subjecting carbonaceous material to heat to eliminate moisture and reduce the amount of volatile matter therein, mixing the resulting product with iron ore, causing such mixture to move over a non-adhering bed which is maintained at a lower temperature than said material, radiating heat on to such material from a source out of contact therewith and extending over the same and rabbling said material while it is being so heated.

In testimony whereof I have hereunto subscribed my name this 20th day of December, 1920.

EDWIN B. THORNHILL.